(12) United States Patent
Kooyman et al.

(10) Patent No.: US 9,914,092 B2
(45) Date of Patent: Mar. 13, 2018

(54) METHOD AND DEVICE FOR COOL DRYING A GAS

(71) Applicant: ATLAS COPCO AIRPOWER, NAAMLOZE VENNOOTSCHAP, Wilrijk (BE)

(72) Inventors: Maarten Kooyman, Wilrijk (BE); Johan Hendrik R. De Herdt, Wilrijk (BE); Frank Jacques E. Roelants, Wilfrijk (BE); Frits Cornelis A. Baltus, Wilrijk (BE)

(73) Assignee: ATLAS COPCO AIRPOWER NAAMLOZE VENNOOTSCHAP, Wilrijk (BE)

( * ) Notice: Subject to any disclaimer, the term of this patent is extended or adjusted under 35 U.S.C. 154(b) by 0 days.

(21) Appl. No.: 15/309,609

(22) PCT Filed: Apr. 27, 2015

(86) PCT No.: PCT/BE2015/000015
§ 371 (c)(1),
(2) Date: Nov. 8, 2016

(87) PCT Pub. No.: WO2015/168754
PCT Pub. Date: Nov. 12, 2015

(65) Prior Publication Data
US 2017/0151529 A1    Jun. 1, 2017

(30) Foreign Application Priority Data
May 9, 2014    (BE) .................................. 2014/0346

(51) Int. Cl.
*B01D 53/26* (2006.01)
*F25B 47/00* (2006.01)
*F25B 47/02* (2006.01)

(52) U.S. Cl.
CPC .......... *B01D 53/265* (2013.01); *F25B 47/006* (2013.01); *F25B 47/022* (2013.01);
(Continued)

(58) Field of Classification Search
CPC .... B01D 53/265; F25B 47/022; F25B 47/006; F25B 2400/0411; F25B 2400/0403; F25B 2600/2513
See application file for complete search history.

(56) References Cited

U.S. PATENT DOCUMENTS 6,393,850 B1 *  5/2002  Vanderstraeten .... B01D 5/0039
                                                       62/196.3
6,467,292 B1 * 10/2002  Praxmarer ............ F25B 49/025
                                                       62/228.3
(Continued)

FOREIGN PATENT DOCUMENTS

CN    201811509 U    4/2011
EP      1103296 A1   5/2001

OTHER PUBLICATIONS

International Search Report (ISR) dated Mar. 30, 2016, for PCT/BE2015/000015.
Written Opinion dated Jul. 21, 2016, for PCT/BE2015/000015.

*Primary Examiner* — Emmanuel Duke
(74) *Attorney, Agent, or Firm* — Bacon & Thomas, PLLC

(57) ABSTRACT

A method for cool drying gas by guiding gas through the secondary section of a heat exchanger whose primary section forms the evaporator of a closed cooling circuit in which a coolant can circulate by means of a compressor that is followed by a condenser and expansion means through which the coolant can circulate, whereby use is made of an air-cooled condenser with a frequency controlled fan, and
(Continued)

the method comprises the step of controlling the speed of the aforementioned fan so that the condenser pressure is kept equal to a target value.

14 Claims, 1 Drawing Sheet

(52) U.S. Cl.
CPC ............... *F25B 2400/0403* (2013.01); *F25B 2400/0411* (2013.01); *F25B 2600/2513* (2013.01)

(56) References Cited

U.S. PATENT DOCUMENTS

| | | | |
|---|---|---|---|
| 2002/0174665 A1* | 11/2002 | Pritchard | ............... C09K 3/12 62/77 |
| 2003/0014988 A1 | 1/2003 | Watanabe et al. | |
| 2005/0274133 A1* | 12/2005 | Barsanti | ............... F25B 41/062 62/225 |

* cited by examiner

METHOD AND DEVICE FOR COOL DRYING A GAS

The present invention relates to a method for cool drying a gas.

More specifically, the invention is intended for cool drying a gas, whereby water vapour in the gas is condensed by guiding the gas through the secondary section of a heat exchanger whose primary section forms the evaporator of a closed cooling circuit in which a coolant can circulate by means of a compressor that is installed in the cooling circuit downstream from the evaporator and which is followed by a condenser and expansion means through which the coolant can circulate.

BACKGROUND OF THE INVENTION

Cool drying is, as is known, based on the principle that by lowering the gas temperature the moisture in the gas condenses, after which the condensate is separated in a liquid separator and after which the gas is again heated such that this gas is no longer saturated.

It is known that in most cases compressed air, supplied by a compressor for example, is saturated with water vapour or, in other words, it has a relative humidity of 100%. This means that in the event of a temperature drop to below the 'dew point' condensation occurs. Because of the condensed water corrosion occurs in the pipes and tools that draw off compressed air from the compressor, and equipment can present premature wear.

It is consequently necessary to dry this compressed air, which can be done in the aforementioned way by cool drying. Air other than compressed air or other gases can also be dried in this way.

A method for cool drying is already known whereby the condenser is an air-cooled condenser that is equipped with one or more fans.

These fans can be switched on and off depending on the cooling required for the condenser and coolant.

These fans will be switched on at a certain threshold value and switched off again at another threshold value.

Hereby more cooling is often done than is strictly necessary in order to have a certain reserve, such that the energy consumption of such a fan is often higher than what is really necessary.

The switching on or off of the fan will vary the condenser pressure.

This has the disadvantage that when the condenser pressure rises, the compressor will consume more power.

An additional disadvantage is that the varying condenser pressure affects the expansion means and other valves in the cooling circuit, and consequently also the evaporator pressure and cooling capacity of the cooling circuit.

Consequently the expansion means and other valves must be adjusted in order to prevent fluctuations of the evaporator pressure.

This leads to a very complex control of the system.

SUMMARY OF THE INVENTION

The purpose of the present invention is to provide a solution to at least one of the aforementioned and other disadvantages.

The object of the present invention is a method for cool drying a gas, whereby water vapour in the gas is condensed by guiding the gas through the secondary section of a heat exchanger whose primary section forms the evaporator of a closed cooling circuit in which a coolant can circulate by means of a compressor that is installed in the cooling circuit downstream from the evaporator, and which is followed by a condenser and expansion means through which the coolant can circulate, whereby use is made of an air-cooled condenser with a frequency controlled fan, and the method comprises the step of controlling the speed of the aforementioned fan so that the condenser pressure is kept equal to a calculated or set target value.

An advantage is that such a method that makes use of a frequency controlled fan enables the condenser pressure to be kept constant by suitably adjusting the speed of the fan.

This has the advantage that the evaporator pressure will not vary and that the valves in the cooling circuit do not or almost do not have to be adjusted as a result of changes in the condenser pressure.

This means that the control and adjustment of such a device is much simpler.

Another advantage is that a frequency controlled fan will last longer than a fan that can only be switched on and off.

The valves in the cooling circuit will also last longer as they do not have to be constantly adjusted.

The condenser pressure can be kept constant at a precalculated or set value that is preferably chosen such that the combined power absorbed by the fan and the compressor is a minimum.

It is known that the power consumed by the fan can be determined from the speed of the fan. The fan speed will determine the condenser pressure. The compressor power can be determined on the basis of the condenser pressure and the evaporator pressure.

Consequently by suitably choosing the condenser pressure the combined power can be kept to a minimum such that the device will consume very little energy.

The invention also concerns a device for cool drying a gas, whereby water vapour in the gas is condensed by cooling the gas, whereby this device is provided with a heat exchanger with a secondary section through which the gas to be dried is guided in order to cool the gas, and with a primary section that forms the evaporator of a closed cooling circuit in which a coolant can circulate by means of a compressor downstream from the evaporator, whereby downstream between the compressor and the evaporator the cooling circuit successively comprises a condenser and expansion means through which the coolant can circulate, whereby the condenser comprises a frequency controlled fan, whereby the device comprises a control unit and whereby the control unit controls the speed of the aforementioned fan such that the condenser pressure is kept equal to a calculated or set target value.

The advantages of a device according to the invention are analogous to the above-mentioned advantages.

BRIEF DESCRIPTION OF THE DRAWINGS

With the intention of better showing the characteristics of the invention, a few preferred variants of a method and device according to the invention are described hereinafter by way of an example, without any limiting nature, with reference to the accompanying drawings, wherein.

DETAILED DESCRIPTION OF THE INVENTION

Figure 1:
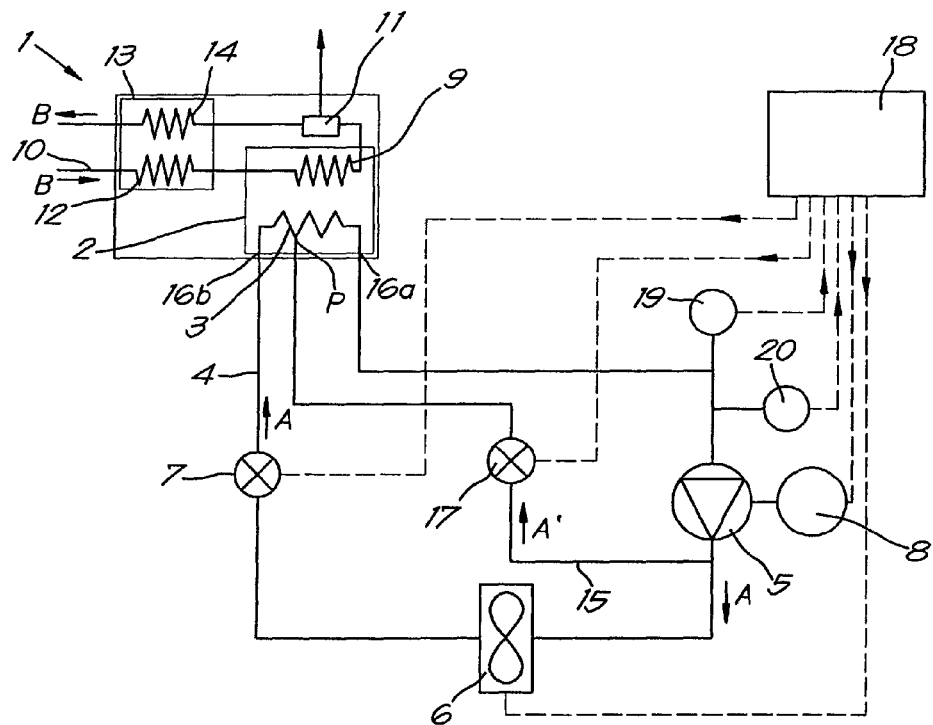
FIG. 1 schematically shows a device according to the invention.

The device 1 shown in FIG. 1 for cool drying essentially consists of a heat exchanger 2 whose primary section forms the evaporator 3 of a closed cooling circuit 4, in which a compressor 5, a condenser 6 and expansion means 7 are also placed in succession.

In this case the compressor 5 is driven by a motor 8 and is used to make a coolant circulate through the cooling circuit 4 according to arrow A. The compressor 5 can be a volumetric compressor for example, while the motor 8 is an electric motor for example.

The coolant can be R404a for example, but the invention is of course not limited as such.

In this case and preferably the expansion means 7 are formed by an expansion valve 7.

The secondary section 9 of the heat exchanger 2 forms part of a pipe 10 for drying moist air whose direction of flow is indicated by arrow B. The entrance of this pipe 10 can be connected to an outlet of a compressor, for example, for the supply of the compressed air to be dried.

After the secondary section 9 of the heat exchanger 2, more specifically at its output, a first liquid separator 11 is installed in the pipe 10.

In this case a section 12 of this pipe 10, before it reaches the secondary section 9 of the heat exchanger 2, extends through a precooler or recovery heat exchanger 13.

After the secondary section 9 a section 14 of this pipe 10 also extends through this recovery heat exchanger 13, with the opposite flow to the aforementioned section 12.

The heat exchanger 2 is a liquid coolant-air heat exchanger and constructionally can form one unit with any recovery heat exchanger 13 that is an air-air heat exchanger.

The output of the aforementioned pipe 10 can be connected to a compressed air network (not shown in the drawings), for example, to which compressed air consumers are connected such as tools that are driven by compressed air.

In this case the compressor 5 is bypassed by one bypass pipe 15 that connects the outlet of the compressor 5 to the injection point P that is located upstream from the compressor, but downstream from the outlet 16 of the evaporator.

The bypass pipe 15 is constructed with a hot gas bypass valve 17 for tapping off coolant from the cooling circuit 4.

Downstream from the injection point P and upstream from the compressor, a second liquid separator 18 is incorporated in the closed cooling circuit 4.

According to the invention the condenser 6 is an air-cooled condenser that is equipped with a frequency controlled fan 19, whose speed is infinitely adjustable in this case.

The device 1 is further provided with a control unit 20. The control unit 20 is connected to the motor 8 and the fan 19 in order to control them.

The control unit 20 is also connected to means 21 to determine the condenser pressure and to means 22 to determine the evaporator pressure.

It is clear that it is not excluded that means are provided to determine the lowest gas temperature (LAT) of the gas to be dried.

It is clear that the means 22 determine the evaporator temperature instead of the evaporator pressure in view of the unequivocal link between the two.

The method for cool drying by means of a device 1 according to FIG. 1 is very simple and as follows.

The air to be dried is carried through the pipe 10 and thus through the secondary section 9 of the heat exchanger 2 according to arrow B.

In this heat exchanger 2 the moist air is cooled under the influence of the coolant that flows through the primary section of the heat exchanger and thus the evaporator 3 of the cooling circuit 4, 2.

As a result condensate is formed that is separated in the first liquid separator 11.

The cold air that contains less moisture in absolute terms after this first liquid separator 11, but still has a relative humidity of 100%, is heated in the recovery heat exchanger 13 under the influence of the newly supplied air to be dried, such that the relative humidity falls to preferably below 50%, while the new air to be dried is already partially cooled in the recovery heat exchanger 13 before being carried to the heat exchanger 2.

The air at the output of the recovery heat exchanger 13 is thus drier than at the input of the heat exchanger 2.

To enable cooling of the moist air to be cooled in the secondary section 9 of the heat exchanger, the coolant is guided through the cooling circuit in the direction of arrow A through the evaporator 3 or the primary section of the heat exchanger 2.

The warm coolant that comes out of the evaporator 3 is in the gas phase and will be raised to a higher pressure by the compressor 5, then cooled in the condenser 6 by the fan 19 and condensed.

Any liquid coolant still present after the evaporator 3 will be held back by the second liquid separator 18.

The liquid cold coolant will then be expanded by the expansion valve 7 and will cool further, before being driven to the evaporator 3 to cool the air to be dried there.

Under the influence of heat transfer the coolant will warm up in the evaporator 3, evaporate and again be guided to the compressor 5.

The hot gas bypass valve 17 in the bypass pipe 15 will ensure that when the air in the heat exchanger 2 cools down too greatly, for example in the event of a variable load of the cool dryer, a certain quantity of coolant in the form of a hot gas will be driven across the compressor via the aforementioned bypass pipe 15 in the direction of the arrow A'. In this way the cooling capacity of the device 1 can decrease and prevent the condensate in the heat exchanger from freezing or the temperature of the coolant falling too greatly.

In order to keep the control of the cooling circuit 4 as simple as possible, the fan 19 will be controlled by the control unit 20 such that the condenser pressure $p_c$ is kept constant at a calculated or set target value.

In order to determine this target value, in this case use is made of a matrix that is stored in the control unit 20, for example.

Figure 2:
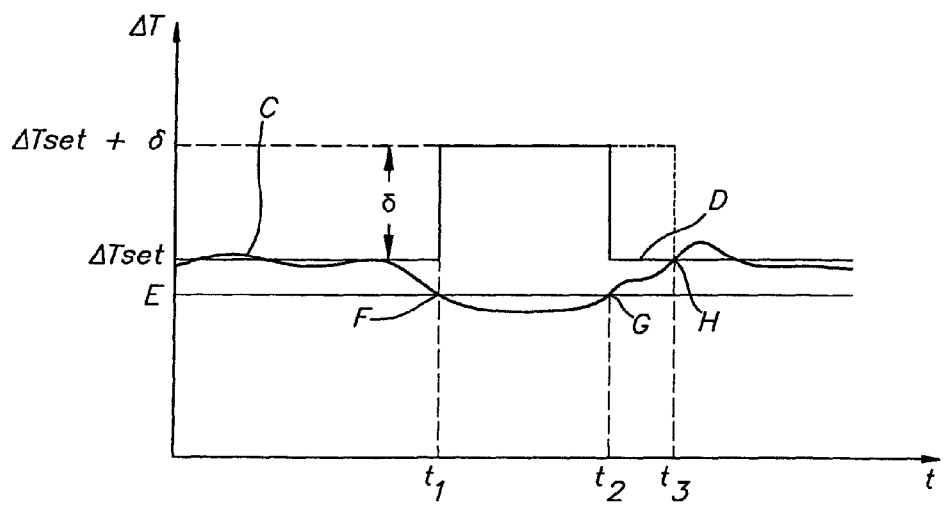
FIG. 2 schematically shows a matrix that shows the combined power absorbed by the compressor and fan as a function of the evaporator pressure and condenser pressure.

An example of such a matrix is shown in FIG. 2.

The matrix gives the combined power that is absorbed by the compressor and the fan as a function of the evaporator pressure $p_v$ and the condenser pressure $p_c$.

The control unit 20 receives the value $P_{vn}$ for the evaporator pressure $p_v$ from the means 22. On the basis of this value $P_{vn}$ the control unit 20 determines a target value for the condenser pressure $p_c$ at which the joint combined power is a minimum.

In the example of FIG. 2, the minimum combined power is equal to $x_{nn}$ and the accompanying target value for the condenser pressure is equal to $p_{cn}$.

The control unit 20 will adjust the speed of the fan such that the condenser pressure $p_c$ reaches and maintains the determined target value $p_{cn}$.

In this way the condenser pressure $p_c$ is kept constant and at such a target value that the combined power absorbed by the compressor 5 and the fan 19 is a minimum, which has the advantage that the device 1 will operate under optimum energy-efficient conditions, as the compressor 5 and the fan 19 are the main consumers of energy in the cooling circuit 4.

It is possible that the control unit 20 is such that the target value of the condenser pressure $p_c$ is determined periodically, in other words the control unit 20 periodically determines a target value for the condenser pressure $p_c$ from the matrix on the basis of the signal from the means 22. The interval with which the target value is determined can be chosen as a function of the variation of the load of the device 1 for example.

Instead of using a matrix, the target value for the condenser pressure $p_c$ can also be determined by means of a preprogrammed control algorithm in the control unit 20.

Hereby the control unit 20 will determine the power absorbed by the compressor 5 on the basis of the signal from the means 21 and 22, and determine the power absorbed by the fan 19 on the basis of the current speed of the fan 19 so that the combined power can be determined.

Then the control unit 20 will increase or decrease the speed of the fan 19 by a certain step and again determine the combined power.

The control unit 20 will determine for what fan 19 speed the combined power was a minimum and will adjust the fan 19 to this speed.

If need be the previous steps are repeated iteratively until a minimum combined power is reached.

This control algorithm ensures that the control unit 20 is self-learning as it were and independent of the device 1 and the cooling circuit and consequently can be applied in different devices 1 and cooling circuits 4.

In another preferred embodiment the fan 19 speed is adjusted to the minimum speed whereby the calculated or set target value for the condenser pressure $p_c$ is reached or whereby the condenser pressure $p_c$ is as good as equal to the target value.

This target value may be determined on the basis of the methods described above, or otherwise.

This has the advantage that the fan speed is no higher than is strictly necessary.

When at a certain speed the target value for the condenser pressure $p_c$ is reached within a certain allowed tolerance, it is not necessary to further increase the speed in order to actually reach the target value. Indeed, it is possible that, in order to actually reach the target value, the speed will still have to increase very substantially. This will be coupled with a strong increase in the consumed power of the fan 19, while the variation of the condenser pressure $p_c$ will only be limited.

It is clear that the calculated or set target value can be determined in many different ways so that the combined power absorbed by the compressor 5 and the fan 19 is a minimum.

It is also clear that the fan 19 speed can be controlled or adjusted in many different ways by the control unit 20 so that the condenser pressure $p_c$ is kept equal to the target value.

Although in the example shown the device 1 is provided with only one heat exchanger 2, it is clear that a number of heat exchangers 2 can also be provided.

The present invention is by no means limited to the embodiment described as an example and shown in the drawings, but such a method and device can be realised in different variants without departing from the scope of the invention.

The invention claimed is:

1. A method for cool drying a gas, whereby water vapour in the gas is condensed by guiding the gas through a secondary section of a heat exchanger whose primary section forms an evaporator of a closed cooling circuit in which a coolant can circulate by means of a compressor that is installed in the cooling circuit downstream from the evaporator, and which is followed by a condenser and expansion means through which the coolant can circulate and a bypass pipe with a hot gas bypass valve therein that connects the outlet of the compressor to an injection point upstream from the compressor, wherein the cooling circuit is made of a closed cooling circuit without a liquid separator, in which the method consists of making use of an electronic expansion valve as expansion means with a control of a desired degree of superheating of the coolant and controlling this electronic expansion valve such that the coolant is always superheated at an input of the compressor and wherein the method consists of making use of an electronic hot gas bypass valve, whereby during start-up of the cooling circuit the method comprises the following steps: switching off the control and keeping the electronic expansion valve closed; then simultaneously controlling the hot gas bypass valve until the evaporator pressure has reached a desired value; then switching on the control of the electronic expansion valve to reach the desired degree of superheating of the coolant after the evaporator.

2. The method according to claim 1, wherein the method comprises the following steps when switching off the cooling circuit: switching off the control and completely closing the electronic expansion valve; then simultaneously controlling the electronic hot gas bypass valve so that the evaporator pressure remains constant; then switching off the compressor.

3. The method according to claim 2, wherein when switching off the cooling circuit, the electronic expansion valve is gradually closed.

4. The method according to claim 1, wherein during the operation of the cooling circuit the degree of superheating of the coolant after the evaporator is determined and that when the degree of superheating goes below a threshold value, the method comprises the following steps:
   increasing the desired degree of superheating for the control of the expansion valve;
   as soon as the degree of superheating is greater than the aforementioned threshold value E, lowering the desired degree of superheating for the control of the expansion valve to the original desired degree.

5. The method according to claim 4, wherein during the step of increasing the desired degree of superheating for the control of the expansion valve, the desired degree of superheating is increased by a certain value.

6. The method according to claim 1, wherein the injection point is located downstream from the electronic expansion valve and upstream from the compressor.

7. The method according to claim 1, wherein the method is used to dry gas that originates from the compressor.

8. A device for cool drying a gas, whereby water vapour in the gas is condensed by cooling the gas, whereby this device is provided with a heat exchanger with a secondary section through which the gas to be dried is guided to cool the gas and with a primary section that forms an evaporator of a closed cooling circuit in which a coolant can circulate by means of a compressor downstream from the evaporator, whereby downstream between the compressor and the evaporator the cooling circuit successively comprises a condenser and expansion means through which the coolant can circulate and a bypass pipe with a hot gas bypass valve therein that connects the compressor outlet to an injection point upstream from the compressor, wherein the closed cooling circuit does not contain a liquid separator and that the expansion means are formed by an electronic expansion valve for controlling a desired degree of superheating of the coolant after the evaporator, whereby the device comprises a control unit that will control the expansion valve such that the coolant is always superheated at the compressor input, whereby the hot gas bypass valve is an electronic hot gas bypass valve that is also controlled by the control unit, and whereby the control unit will control the electronic expansion valve and the electronic hot gas bypass valve such that the electronic expansion valve is kept closed while the electronic hot gas bypass valve is controlled until the evaporator pressure has reached a desired value, after which the control unit will control the electronic expansion valve so that the desired degree of superheating of the coolant after the evaporator is reached.

9. The device according to claim 8, wherein when switching off the cooling circuit, the control unit will control the electronic expansion valve and the electronic hot gas bypass valve such that the electronic expansion valve is fully closed while the electronic hot gas bypass valve keeps the evaporator pressure constant before the compressor is closed.

10. The device according to claim 9, wherein when switching off the cooling circuit, the control unit gradually closes the electronic expansion valve.

11. The device according to claim 8, wherein the device is provided with means to determine the degree of superheating of the coolant after the evaporator whereby, when during operation of the cooling circuit the degree of superheating goes below a threshold value, the control unit will increase the desired degree of superheating and control the electronic expansion valve on the basis of this increased desired degree of superheating until the degree of superheating is again higher than the aforementioned threshold value.

12. The device according to claim 11, wherein the control unit will increase the desired degree of superheating by a certain value.

13. The device according to claim 8, wherein the injection point is located downstream from the electronic expansion valve and upstream from the compressor.

14. The device according to claim 8, wherein the gas to be dried originates from the compressor.

* * * * *